United States Patent
Wen

(10) Patent No.: US 9,785,821 B2
(45) Date of Patent: Oct. 10, 2017

(54) CAPACITIVE SENSOR ARCHITECTURE FOR BIOMETRIC SENSING

(71) Applicant: Synaptics Incorporated, San Jose, CA (US)

(72) Inventor: Shengmin Wen, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 108 days.

(21) Appl. No.: 14/975,477

(22) Filed: Dec. 18, 2015

(65) Prior Publication Data

US 2017/0061187 A1 Mar. 2, 2017

Related U.S. Application Data

(60) Provisional application No. 62/211,632, filed on Aug. 28, 2015.

(51) Int. Cl.
G06K 9/00 (2006.01)
(52) U.S. Cl.
CPC .................... *G06K 9/0002* (2013.01)
(58) Field of Classification Search
None
See application file for complete search history.

(56) References Cited

U.S. PATENT DOCUMENTS

| | | | |
|---|---|---|---|
| 5,864,296 A | 1/1999 | Upton | |
| 6,052,475 A * | 4/2000 | Upton | G06K 9/00026 283/69 |
| 7,030,860 B1 * | 4/2006 | Hsu | G06F 3/044 178/18.06 |
| 2010/0026664 A1 * | 2/2010 | Geaghan | G06F 3/044 345/174 |
| 2011/0102569 A1 * | 5/2011 | Erhart | G06K 9/00053 348/77 |
| 2014/0103943 A1 | 4/2014 | Dunlap et al. | |

(Continued)

OTHER PUBLICATIONS

Machida et al, A Novel Semiconductor Capacitive Sensor for a Single-Chip Fingerprint Sensor/Identifier LSI, IEEE Transactions on Electron Devices, vol. 48, No. 10, Oct. 2001.*

(Continued)

*Primary Examiner* — Andrae S Allison
(74) *Attorney, Agent, or Firm* — Leydig, Voit & Mayer, Ltd.

(57) ABSTRACT

A capacitive sensor a method of making a capacitive sensor are disclosed. The capacitive sensor includes: a plurality of rows of sensor electrodes included in a first layer; a plurality of columns of sensor electrodes included in a second layer, where the plurality of columns of sensor electrodes are arranged orthogonally to the plurality of rows of sensor electrodes to form a two-dimensional sensing array; and, a plurality of conductive elements included in a third layer disposed between the first and second layers, wherein, for each conductive element of the plurality of conductive elements, a first end of the conductive element is electrically connected to a sensor electrode in the plurality of rows of sensor electrodes and a second end of the conductive element is capacitively coupled to a sensor electrode in the plurality of columns of sensor electrodes to form a trans-capacitive sensing pixel of the two-dimensional sensing array.

20 Claims, 14 Drawing Sheets

(56) References Cited

U.S. PATENT DOCUMENTS

| | | | |
|---|---|---|---|
| 2014/0241595 A1 | 8/2014 | Bernstein et al. | |
| 2015/0036065 A1* | 2/2015 | Yousefpor | G06K 9/228 349/12 |
| 2015/0242672 A1 | 8/2015 | Benkley et al. | |
| 2016/0004897 A1* | 1/2016 | Slogedal | G06K 9/0002 382/124 |
| 2016/0026844 A1* | 1/2016 | Kim | G06K 9/0002 382/124 |
| 2016/0103526 A1* | 4/2016 | Sohn | G06F 3/044 345/174 |
| 2016/0147336 A1* | 5/2016 | Han | G06F 3/044 345/174 |
| 2016/0163958 A1* | 6/2016 | Park | H01L 41/1132 310/365 |
| 2016/0328597 A1* | 11/2016 | Abiko | G06K 9/3233 |
| 2016/0358007 A1* | 12/2016 | Chung | H01L 24/48 |
| 2017/0061193 A1* | 3/2017 | Young | G06K 9/00013 |

OTHER PUBLICATIONS

Shimamura et al, Capacitive-Sensing Circuit Technique for Image Quality Improvement on Fingerprint Sensor LSIs, IEEE Journal of Solid-State Circuits, vol. 45, No. 5, May 2010.*

* cited by examiner

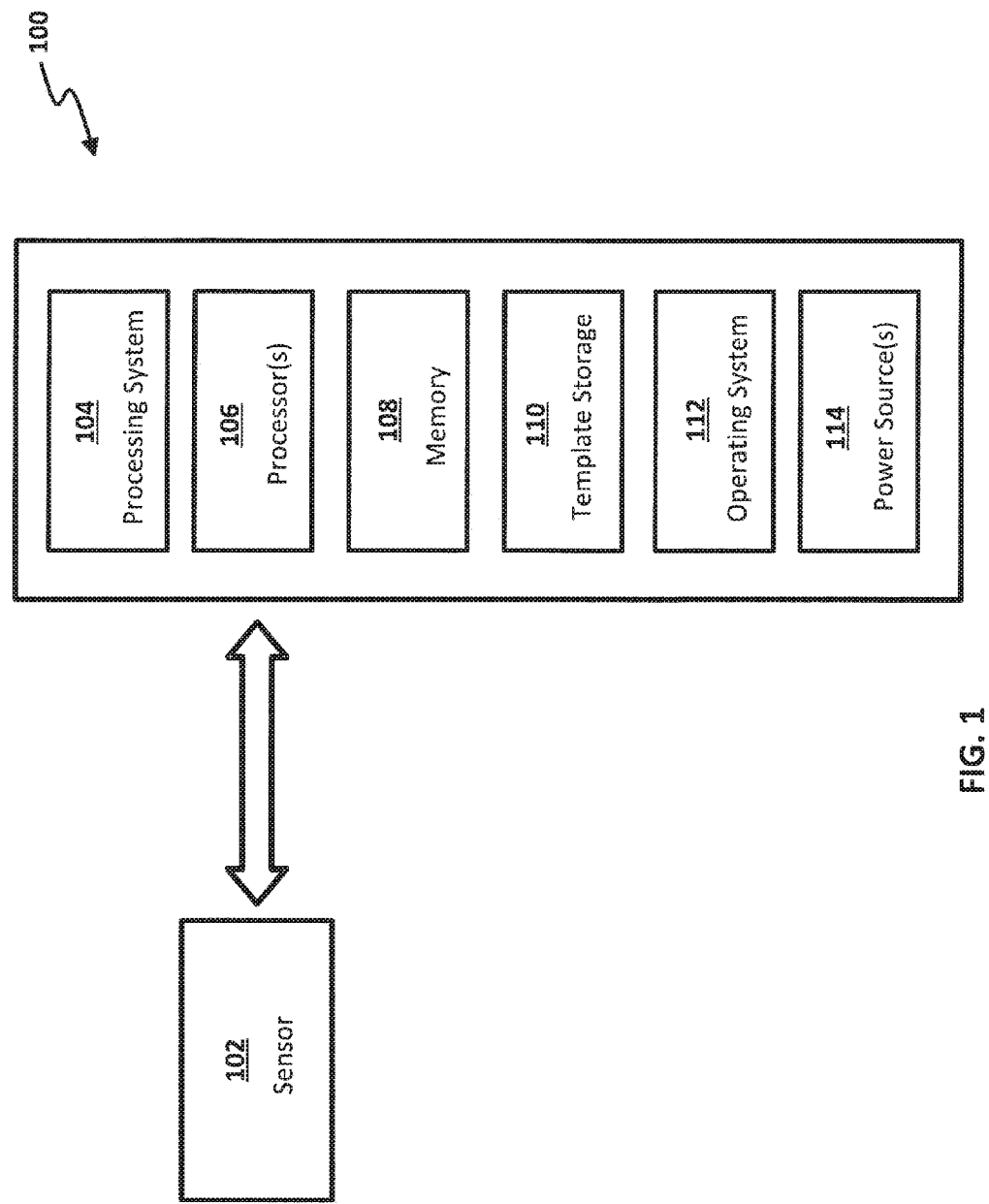

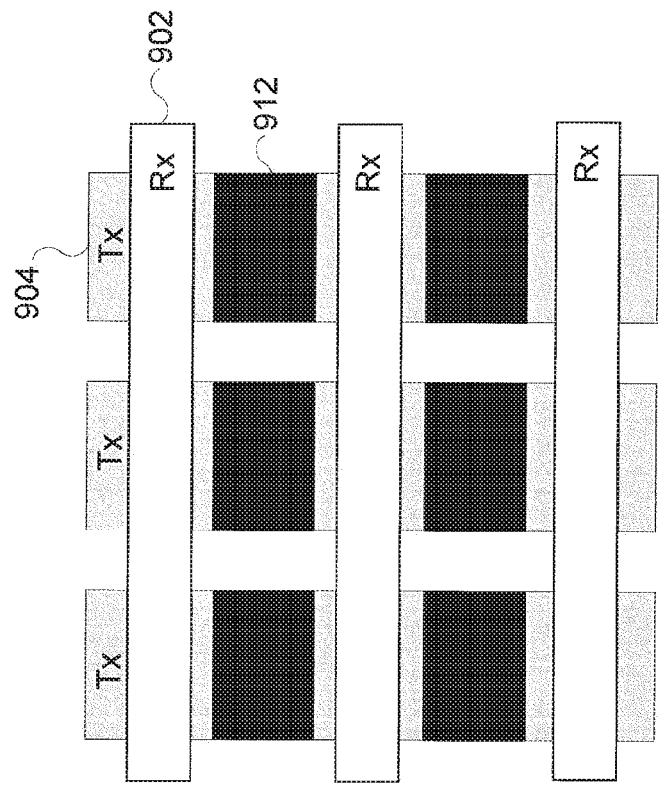
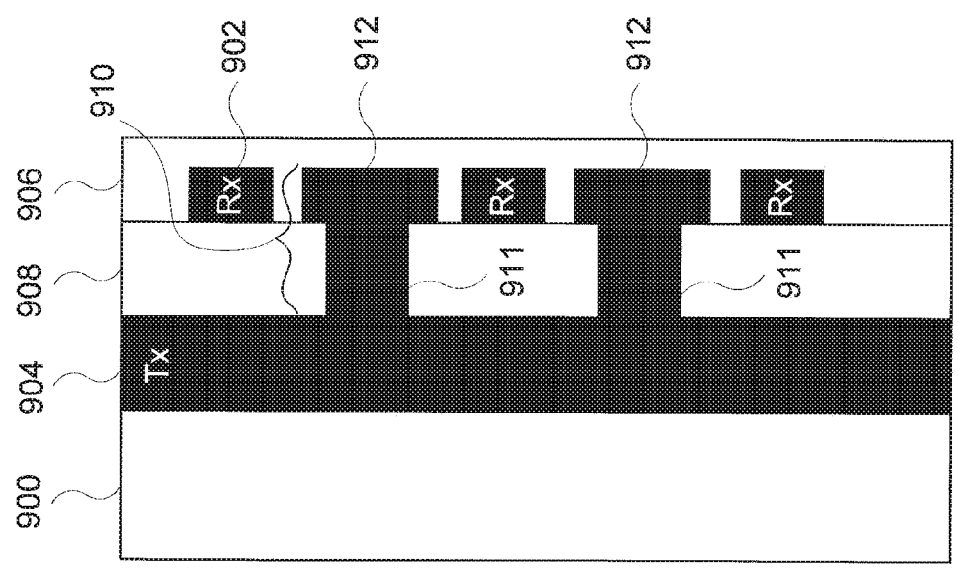
FIG. 9B
FIG. 9A

CAPACITIVE SENSOR ARCHITECTURE FOR BIOMETRIC SENSING

CROSS-REFERENCE TO RELATED APPLICATIONS

This application claims priority to U.S. provisional patent application No. 62/211,632, filed on Aug. 28, 2015, the entire contents of which is hereby incorporated by reference in its entirety.

TECHNICAL FIELD

This disclosure generally relates to capacitive sensors and, more specifically, to fingerprint sensor arrays utilizing mutual capacitance sensing principles.

BACKGROUND

Input devices including proximity sensor devices (also commonly called touchpads or touch sensor devices) are widely used in a variety of electronic systems. Input devices also include fingerprint sensors and other biometric sensor devices. A sensor device typically includes a sensing region, often demarked by a surface, in which the sensor device determines the presence, location, motion, and/or features of one or more input objects. Sensor devices may be used to provide interfaces for an electronic system. For example, sensor devices are often used as input devices for larger computing systems (such as opaque touchpads and fingerprint sensors integrated in, or peripheral to, notebook or desktop computers). Sensor devices are also often used in smaller computing systems (such as touch screens integrated in cellular phones).

Many sensor devices utilize capacitive sensing principles in order to detect the input object. Capacitive sensors, including those based on trans-capacitance, provide several advantages over other sensing technologies. However, capacitively sensing fingerprint features and other fine features is a challenging task. While existing sensors can provide adequate performance, they often suffer from low signal quality. Improving the signal quality can provide several benefits, such as more accurate biometric matching and increased flexibility in integrating the sensor in a variety of applications, e.g., those with thicker cover layers over the capacitive sensor.

SUMMARY

One embodiment provides a capacitive sensor, comprising: a plurality of rows of sensor electrodes included in a first layer; a plurality of columns of sensor electrodes included in a second layer, wherein the plurality of columns of sensor electrodes are arranged orthogonally to the plurality of rows of sensor electrodes to form a two-dimensional sensing array; and, a plurality of conductive elements included in a third layer disposed between the first layer and the second layer, wherein, for each conductive element of the plurality of conductive elements, a first end of the conductive element is electrically connected to a sensor electrode in the plurality of rows of sensor electrodes and a second end of the conductive element is capacitively coupled to a sensor electrode in the plurality of columns of sensor electrodes to form a trans-capacitive sensing pixel of the two-dimensional sensing array.

Another embodiment provides a method of making a capacitive sensor. The method includes: forming a first conductive layer on a first dielectric layer, wherein the first conductive layer includes a plurality of rows of sensor electrodes; forming a second dielectric layer over the first conductive layer; forming a second conductive layer over the second dielectric layer, wherein the second conductive layer includes a plurality of columns of sensor electrodes, and the plurality of columns of sensor electrodes are arranged orthogonally to the plurality of rows of sensor electrodes to form a two-dimensional sensing array; and, forming a plurality of conductive vias in the second dielectric layer between the first conductive layer and the second conductive layer, wherein, for each conductive via of the plurality of conductive vias, a first end of the conductive via is electrically connected to a sensor electrode in the plurality of rows of sensor electrodes and a second end of the conductive via is capacitively coupled to a sensor electrode in the plurality of columns of sensor electrodes to form a trans-capacitive sensing pixel of the two-dimensional sensing array.

Yet another embodiment provides a capacitive sensor, comprising: a first layer comprising a plurality of rows of transmitter electrodes; a second layer disposed above the first layer comprising a plurality of columns of receiver electrodes, wherein the plurality of columns of transmitter electrodes overlap the plurality of rows of receiver electrodes to form a two-dimensional sensing array having a resolution configured to capture features of an input; a plurality of conductive vias between the first layer to the second layer, the plurality of conductive vias comprising a conductive via disposed at a sensing pixel of the two-dimensional sensing array, wherein the conductive via has a first end capacitively coupled to a receiver electrode in the plurality of columns of receiver electrodes and a second end electrically connecting a transmitter electrode of the plurality of rows of transmitter electrodes; a cover layer disposed above the second layer, wherein the cover layer comprises a top surface that forms an input surface for the input and a dielectric separating the top surface from the conductive vias and the second layer; driver circuitry connected to the transmitter electrodes, wherein the driver circuitry is configured to drive a transmitter signal onto the transmitter electrodes; and, receiver circuitry connected to the receiver electrodes, wherein the receiver circuitry is configured to process resulting signals corresponding to the transmitter signals, wherein the resulting signals vary based on presence of the input at the top surface of the cover layer.

BRIEF DESCRIPTION OF THE DRAWINGS

The accompanying drawings incorporated in and forming a part of the specification illustrate several aspects of the present disclosure and, together with the description, serve to explain the principles of the disclosure.

FIG. 1 is a block diagram of an example of a system that includes an input device and a processing system, in accordance with an embodiment of the disclosure.

FIGS. 9A-9C depict capacitive sensors with conductive structures, in accordance with some embodiments of the disclosure.

Figure 2A:
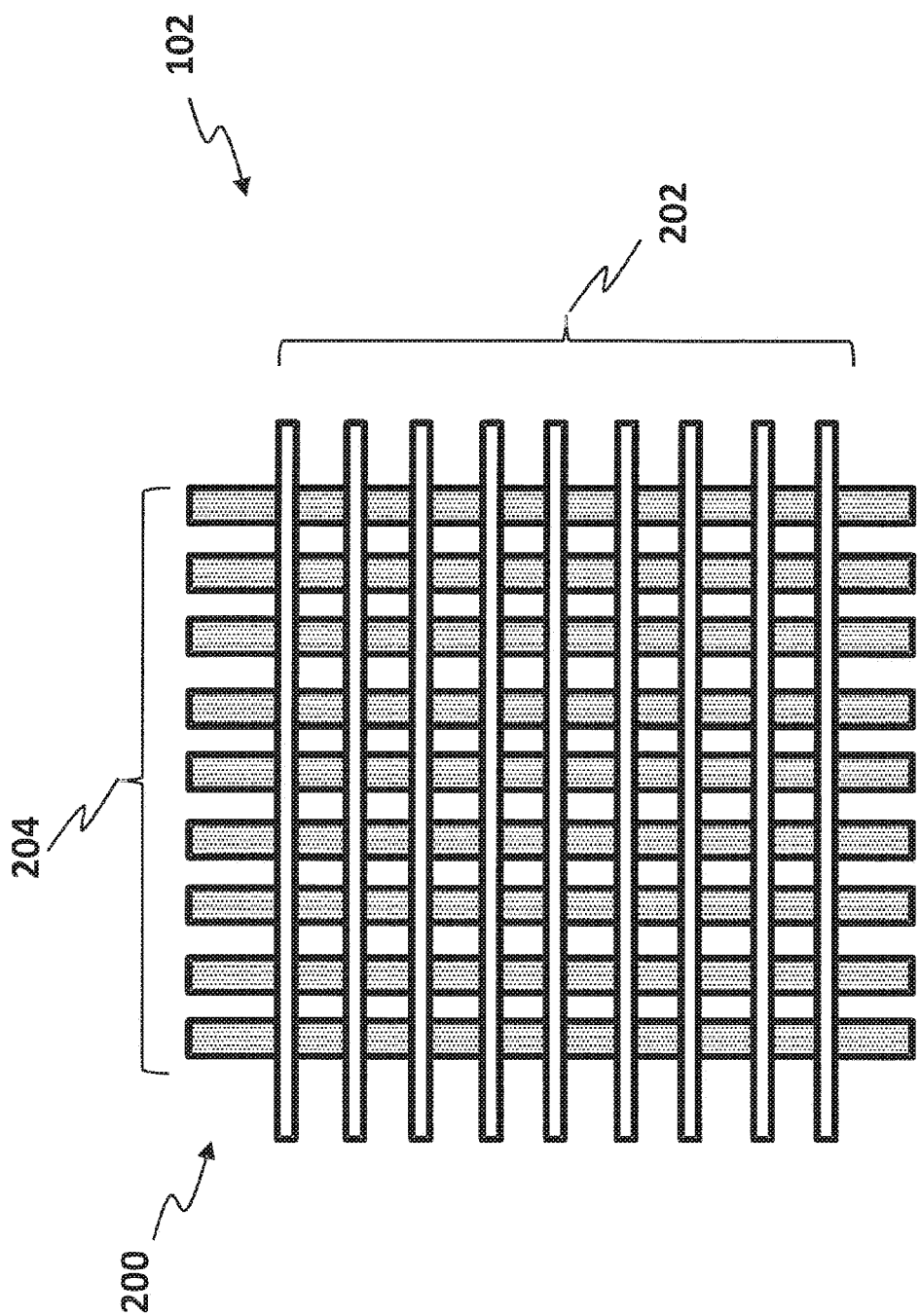
FIG. 2A is a schematic view of a capacitive sensor, in accordance with an embodiment of the disclosure.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Various embodiments of the present disclosure provide input devices and methods that facilitate improved usability. In some capacitive sensor constructions, a receiver electrode layer is stacked on top of (or below) a transmitter electrode layer with a dielectric layer in between. When an input, such as a finger, is provided to the capacitive sensor, a change in the electromagnetic field between the transmitter electrode layer and the receiver electrode layer is detected. However, because the transmitter electrodes and the receiver electrodes are in different layers, the system may suffer from low image quality because the electromagnetic field differences between presence of an input and lack of an input can be small.

Embodiments of the disclosure improve the image quality of such capacitive sensors by bringing up the transmitter electrodes to the same level as the receiver electrodes. As such, a finger touch location is parallel to the transmitter electrode-receiver electrode electromagnetic field where the electromagnetic field is the strongest. The resulting electromagnetic field detection is improved relative to conventional approaches. Embodiments of the disclosures solve the signal-to-noise weakness issue by bringing up the signal strength level. Strong signal strength provides higher resolution fingerprint images, and therefore image quality is greatly improved.

Turning now to the figures, FIG. 1 is a block diagram of an electronic system or device 100 that includes an input device such as sensor 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include $I^2C$, SPI, PS/2, Universal Serial Bus (USB), Bluetooth, RF, and IRDA.

The device 100 may utilize any combination of sensor components and sensing technologies to detect user input in the sensing region. The device 100 comprises one or more sensing elements for detecting user input. For example, the device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" (or "trans-capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "Tx electrodes") and one or more receiver sensor electrodes (also "receiver electrodes" or "Rx electrodes"). Transmitter sensor electrodes may be modulated relative to a reference voltage to transmit transmitter signals. The reference voltage may be a substantially constant voltage in various embodiments, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals).

It will be appreciated that embodiments of this disclosure are also usable in environments utilizing "self-capacitance" techniques. "Self capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments, the reference voltage may be system ground.

In certain embodiments, sensor 102 is a biometric sensor utilizing one or more various electronic sensing technologies to capture an image of a biometric pattern, such as a fingerprint, palm print, handprint, or vein pattern of a user. In certain embodiments, the biometric sensor is a capacitive fingerprint sensor that utilizes mutual capacitance sensing techniques between sensor electrodes in a second mode to detect presence of a finger or other biometric object in a sensing area. In a fingerprint sensor embodiment, for example, upon detection of a finger, the fingerprint sensor may utilize a full array of sensor electrodes in a first mode to capture an image of a fingerprint in the sensing area using mutual capacitance or self-capacitance sensing techniques. By way of example, the sensor electrodes used to detect presence of a finger in the second mode may be separate presence sensing electrodes, or they may be a selected subset of the electrodes used to capture the image of the fingerprint.

Turning now to the processing system 104 in FIG. 1, basic functional components of the electronic device 100 utilized during capturing and storing a user fingerprint image are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor(s) 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Fingerprint sensors are sometimes referred to as swipe sensors or placement sensors depending on their principle of operation. Typically, swipe sensors capture an image that is larger than the sensing area by capturing a series of scans of the fingerprint as the user swipes or otherwise moves their finger over the sensing area. A processing system then reconstructs the scans into a larger image. Since the image is reconstructed from a series of scans, this allows the sensing array to be made small, such as a small two-dimensional array or even as small as a single linear array, while still capturing a series of scans that can be reconstructed into a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

FIG. 2A is a schematic view of a capacitive sensor, in accordance with an embodiment of the disclosure. As shown, sensor 102 is configured as a capacitive sensor that includes a plurality of electrodes 200 that form a two-dimensional array of pixels. In the sensor 102 of FIG. 2A, rows of receiver electrodes 202 overlap columns of transmitter electrodes 204 to form a pixel based on a capacitive coupling at each overlap location. In one implementation, the receiver electrodes 202 and transmitter electrodes 204 are formed on the same substrate. In another implementation, they are formed on different substrates. In either case, a dielectric may separate the set of transmitter electrodes 204 and the set of receiver electrodes 202 at each overlap location, and one of the sets may be closer to a sensing area where a finger or other object is placed. In one implementation, the receiver electrodes 202 are disposed closer to a sensing area of the capacitive sensor 102.

In the embodiment illustrated in FIG. 2A, the transmitter electrodes 204 and receiver electrodes 202 are depicted as sets of bars and stripes, respectively. The transmitter electrodes 204 each extend parallel to each other, and the receiver electrodes 202 also extend parallel to each other, in a different direction from the transmitter electrodes to form a two-dimensional array of pixels. In the illustrated embodiment, the transmitter electrodes 204 and receiver electrodes 202 extend orthogonal to each other. The transmitter electrodes 204 and receiver electrodes 202 may be formed, for example, on separate respective substrates, or opposing sides of the same substrate, and in either case the substrate material may separate the transmitter electrodes 204 and receiver electrodes 202 to form capacitive gaps between them at each overlap location.

Figure 2B:
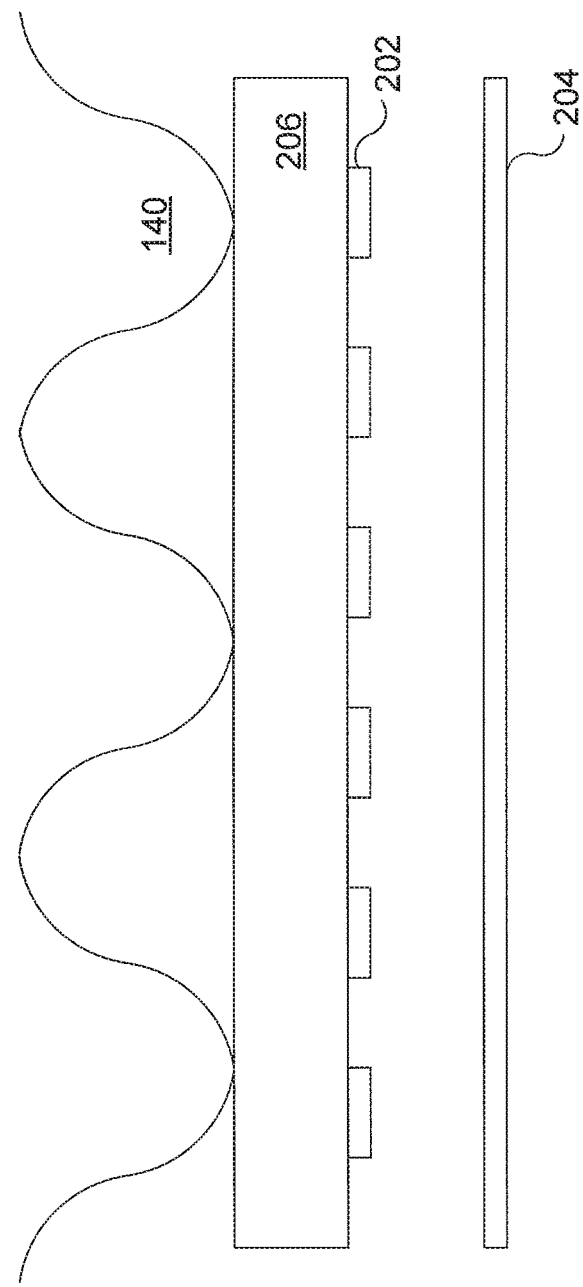
FIG. 2B illustrates a cross-section view of a capacitive sensor including a cover layer, according to one embodiment of the disclosure.

FIG. 2B illustrates a cross-section view of a capacitive sensor including a cover layer 206, according to one embodiment of the disclosure. A cover layer 206 protects the sensing circuitry and can also ohmically insulate the sensor electrodes from contact with the input object 140, such as a finger. Unfortunately, separation distance between the transmitter electrodes 204 and receiver electrodes 202, as well as the additional separation from the cover layer 206, makes it difficult to capture a high quality signal from the input object 140, as a relatively weak electric field extends into the sensing region above the cover layer 206. As show in FIGS.

Figure 2C:
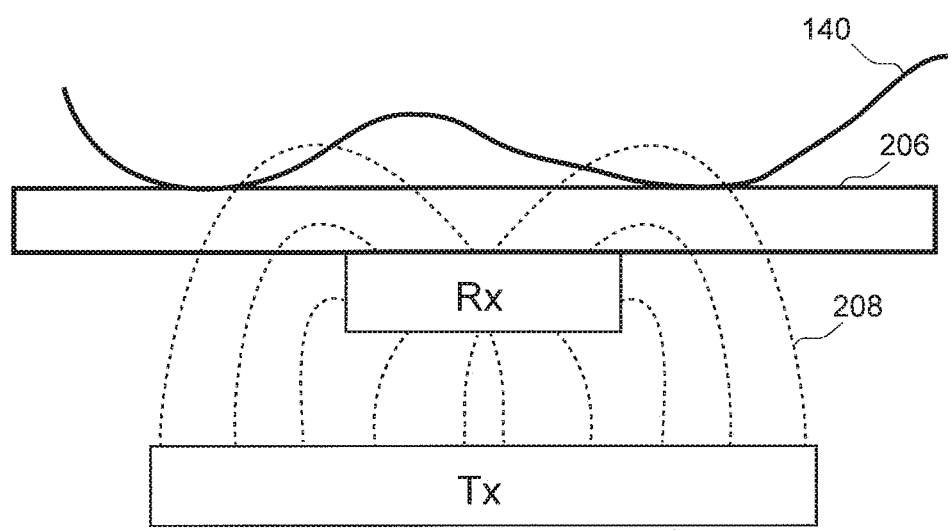
FIG. 2C illustrates electric field lines of a capacitive sensor, according to one embodiment of the disclosure.

2B-2C, presence of an input object 140, in this example, a finger and more specifically fingerprint features of the finger (such as ridges and valleys), interacts with the electric field lines 208 and changes the observed capacitive coupling at the receiver electrodes (Rx) (see example electric field lines 208 shown in FIG. 2C for a subset of the sensing pixels).

According to embodiments of the disclosure, the signal can be improved by bringing the transmitter electrodes (Tx) and receiver electrodes (Rx) in the same plane or otherwise bringing them closer together, as this improves the electric field extending into the sensing region. One possible solution is to use a diamond pattern for the sensor electrodes. An example diamond pattern is depicted in FIG. 3.

Figure 3:
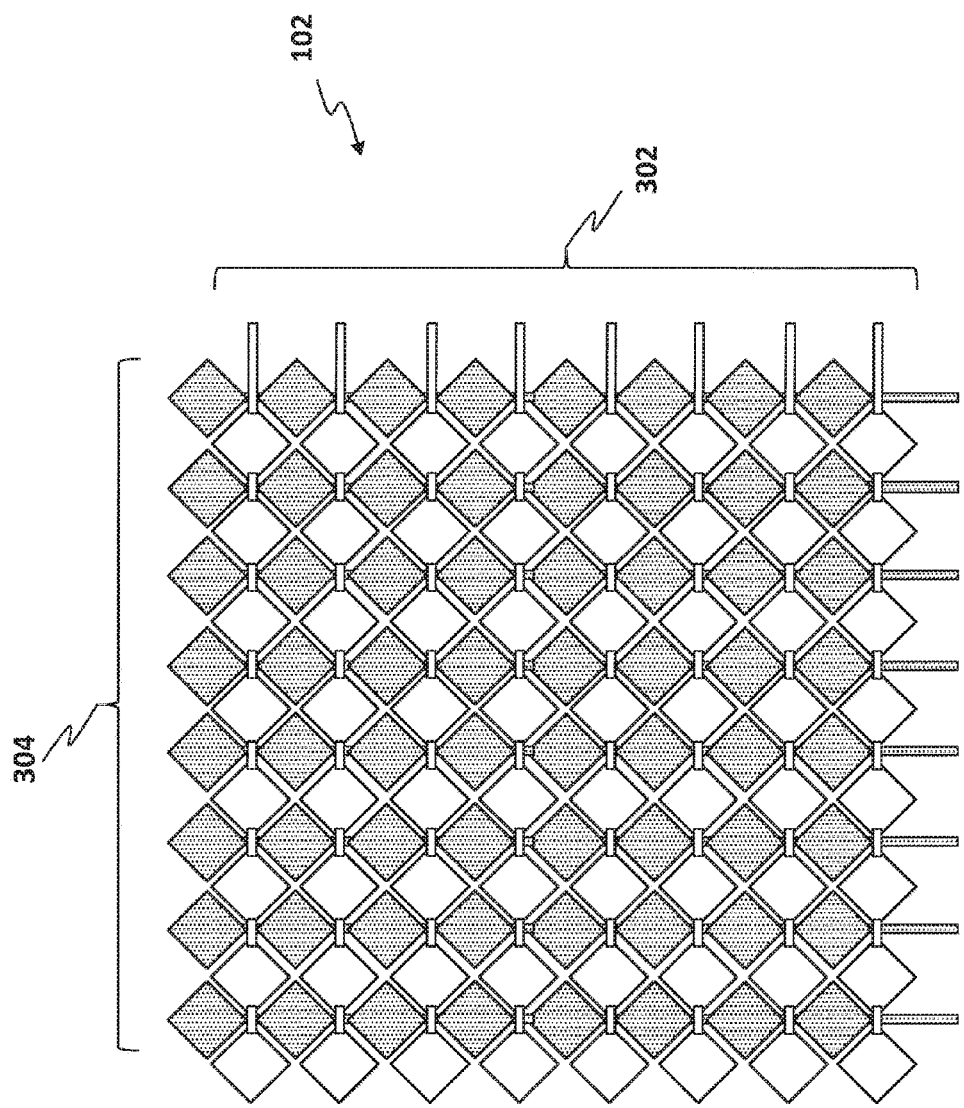
FIG. 3 depicts an example diamond pattern for sensor electrodes, according to an embodiment of the disclosure.

In the embodiment illustrated in FIG. 3, the transmitter electrodes 304 and receiver electrodes 302 are depicted as forming a diamond sensor pattern. In this embodiment, rows of receiver electrodes overlap columns of transmitter electrodes. Specifically, each of the transmitter electrodes 304 is made up of a set of interconnected diamonds, and each of the transmitter electrodes extends parallel to each other. Similarly, each of the receiver electrodes 302 is made up of a set of interconnected diamonds, and each of the receiver electrodes extends parallel to each other, perpendicular to the transmitter electrodes. In the illustrated embodiment, the receiver electrodes overlap the transmitter electrodes at narrower portions along the length of each electrode. The diamond sensor pattern of FIG. 3 may be formed in a variety of ways. For example, the receiver electrodes and transmitter electrodes may be formed in the same layer, on the same side of an insulating substrate. Small amounts of dielectric may be used over the narrower portions of the transmitter electrodes 304, so that the diamonds of each receiver electrode can be interconnected with conductive material over the transmitter electrodes, without creating ohmic contact between the receiver electrodes and transmitter electrodes. The diamond pattern may also be formed with the receiver electrodes and transmitter electrodes on separate substrates, or opposing sides of the same substrate, as described above.

It will be appreciated that other sensor array patterns are possible without departing from the principles described herein. For example, other electrode shapes besides diamond patterns, bars, and stripes are possible without departing from certain principles described herein. Similarly, other electrode orientations besides perpendicular rows and columns are possible without departing from certain principles described herein. It will also be appreciated that transmitter signals can be driven onto each of the transmitter electrodes 304 and resulting signals can be detected at each of the receiver electrodes 302 using a variety of modulation schemes in order to capture an image of the sensing area. In one implementation, the transmitter signals are driven onto each of the transmitter electrodes 304 one at a time, in a sequence one after another. In another implementation, transmitter signals are driven onto multiple transmitter electrodes simultaneously and/or resulting signals are detected at each of the receiver electrodes simultaneously, using a code division multiplexing (CDM) or time-division multiplexing (TDM) sensing scheme.

Figure 4A:
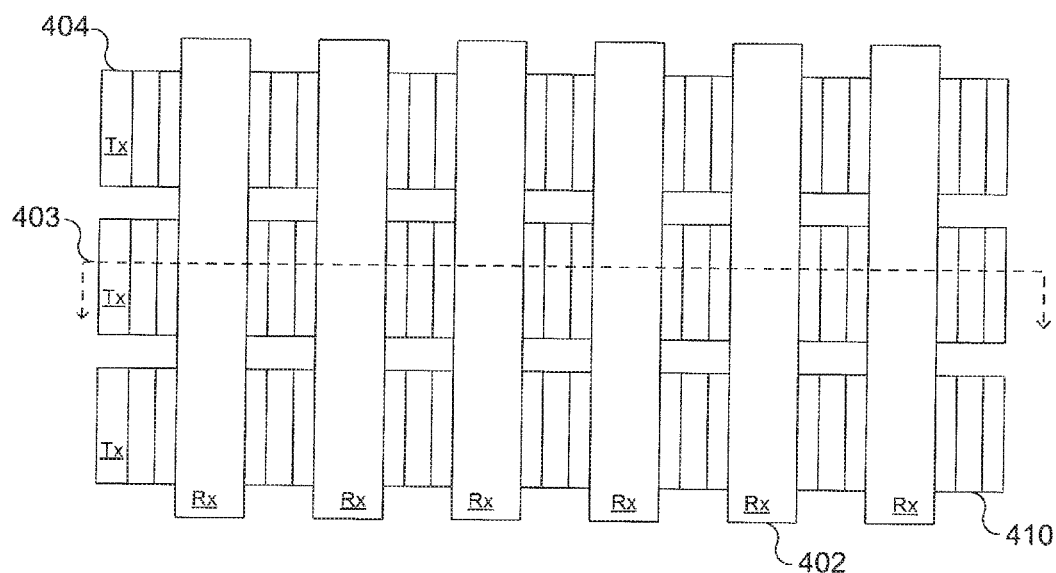
FIGS. 4A-4D depict a capacitive sensor architecture, according to embodiments of the disclosure.
Figure 4B:
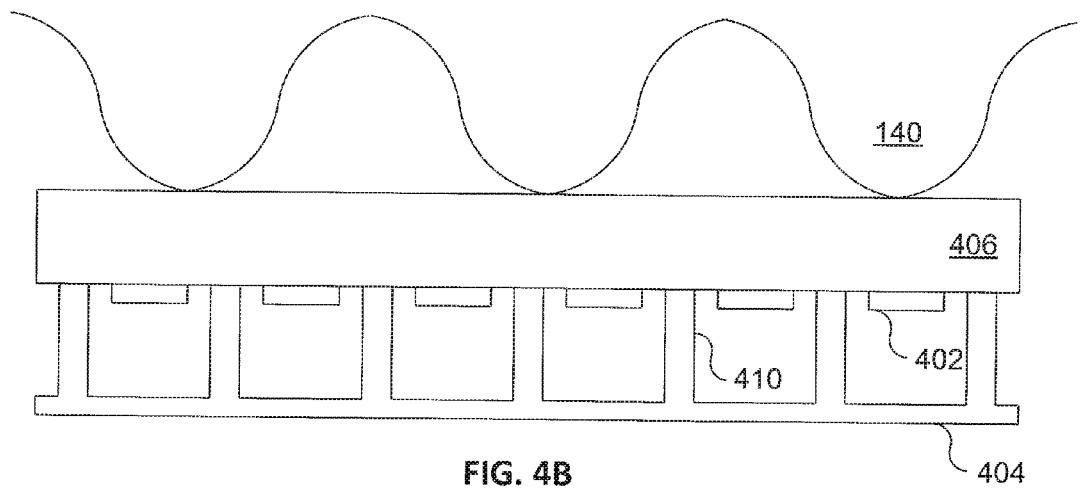
Figure 4C:
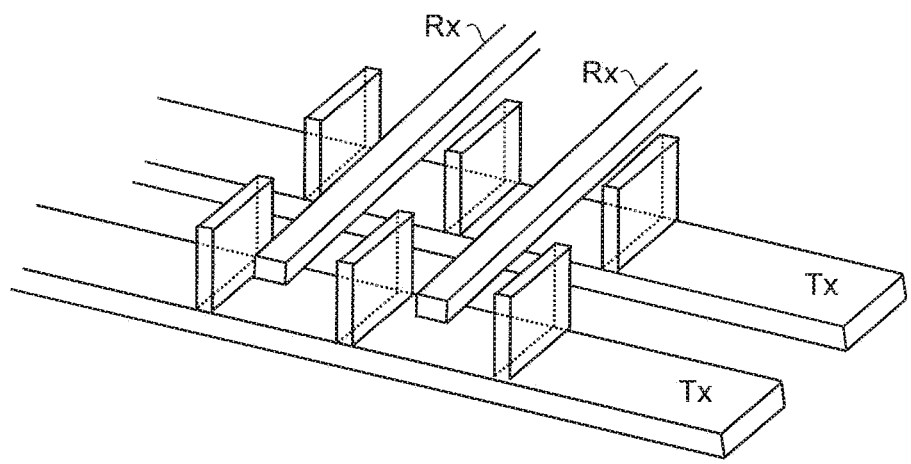
Figure 4D:
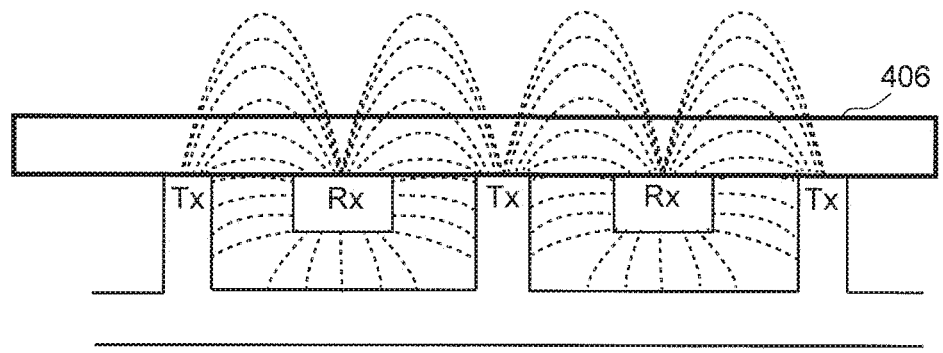

Turning now to FIGS. 4A-4D, a capacitive sensor architecture is depicted according to one embodiment of the disclosure. FIG. 4A depicts a plan view, FIG. 4B depicts a cross-section along the dashed line 403 shown in FIG. 4A, FIG. 4C depicts a three-quarters perspective view, and FIG. 4D depicts exemplary electric field lines resulting from the architecture. The capacitive sensor architecture in FIGS. 4A-4D depicts a mutual capacitance sensor forming a two-dimensional array of sensing pixels formed by capacitive coupling between rows of transmitter (Tx) electrodes 404 and columns of receiver (Rx) electrodes 402. The transmitter electrodes 404 and receiver electrodes 402 are separated by dielectric to form a sensing pixel corresponding to an effective capacitor between the transmitter electrodes 404 and receiver electrodes 402 at each sensing pixel location. Presence of an input object 140, in this example, a finger and more specifically fingerprint features of the finger (such as ridges and valleys), interacts with the electric field lines and changes the observed capacitive coupling at the receiver electrodes 402 (see exemplary electric field lines shown in FIG. 4D for a subset of the sensing pixels).

The embodiment of FIGS. 4A-4D includes conductive elements or structures 410 (shown in the embodiment in FIGS. 4A-4D as conductive rectangular "pillars") connected to the transmitter electrodes 404 at each receiver electrode 402 location to bring the transmitter electrodes 404 at or near the same level as the receiver electrodes 402. As shown in FIG. 4D, the finger touch location can be parallel to the receiver electrode-transmitter electrode electromagnetic (EM) field where the EM field is the strongest. As a result, the image quality can be greatly improved. This can also provide a way to bring the transmitter electrodes 404 and receiver electrodes 402 closer to each other or to the same level using lower cost materials and/or manufacturing processes than alternative approaches.

Figure 5:
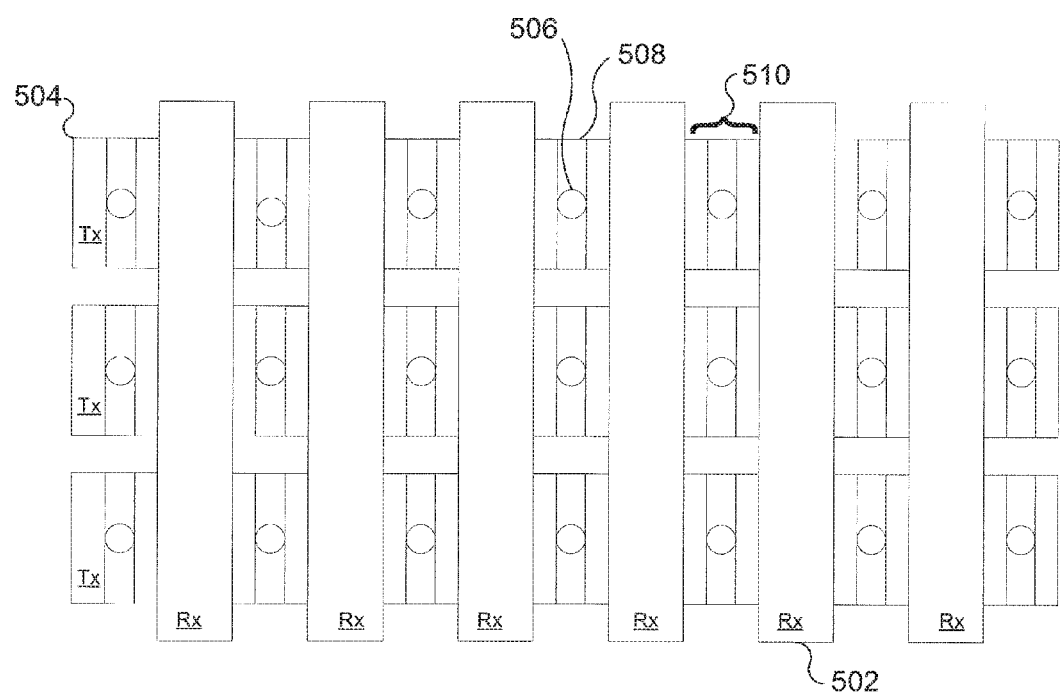
FIG. 5 depicts a capacitive sensor architecture with conductive structures, according to an embodiment of the disclosure.
Figure 9C:
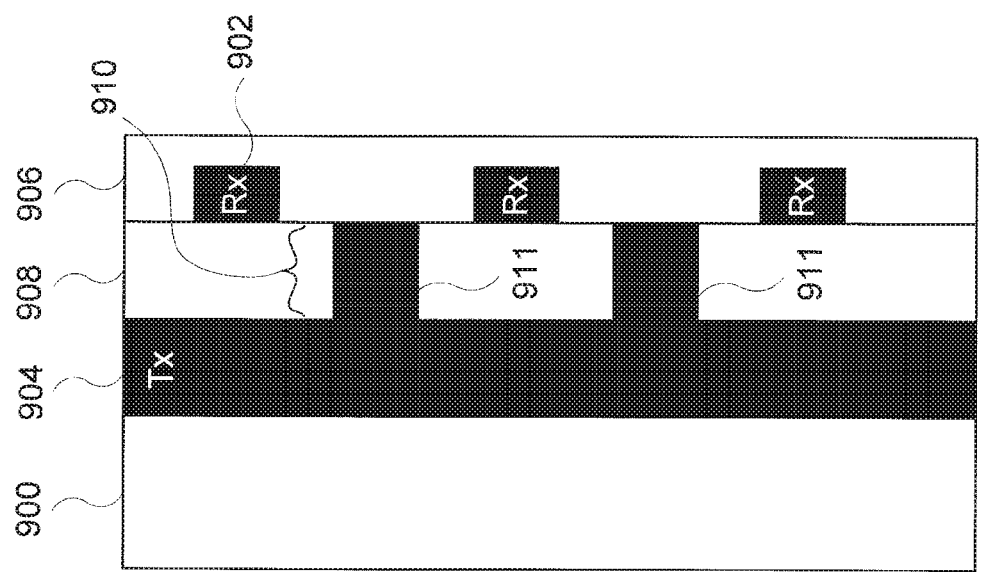

FIG. 5 depicts a capacitive sensor architecture with conductive structures 510, according to an embodiment of the disclosure. The capacitive sensor architecture in FIG. 5 depicts a mutual capacitance sensor forming a two-dimensional array of sensing pixels formed by capacitive coupling between rows of transmitter (Tx) electrodes 504 and columns of receiver (Rx) electrodes 502. As shown in the embodiment in FIG. 4A, the conductive structures 410 can be conductive rectangular pillars that extend the width of the transmitter electrodes 404. In another embodiment, as shown in FIG. 5, the conductive structures 510 may include a via 506 and a plate 508. The via 506 does not extend the width of a given transmitter electrode 510 to which it is electrically connected. In one embodiment, each plate 508 comprises a metal pad that is electrically connected at the top of a single via 506 and may have a rectangular shape. In some embodiments, the plate 508 may be in the same plane as the receiver (Rx) electrodes 502 (see, for example, FIGS. 9A-9B below). In the embodiment shown in FIG. 5, the via 506 is circular shaped, but other shapes are also within the scope of the disclosure. Other shapes for the plate 508 are within the scope of the disclosure. Also, the plate 508 is optional in some embodiments and are not required as part of the conductive structure (e.g., as shown in FIG. 9C below).

Figure 6:
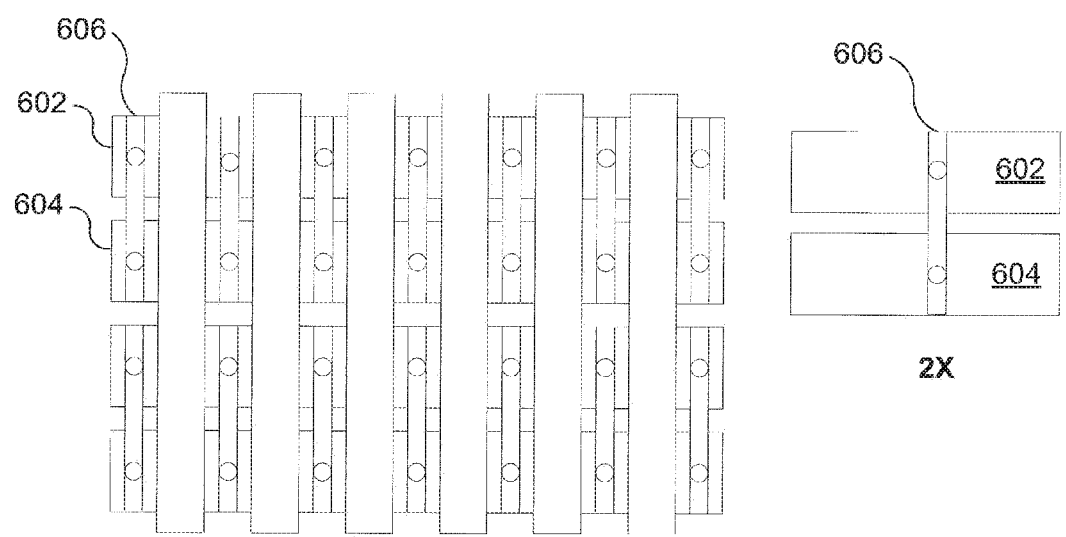
FIGS. 6-7 depict various alternative implementations of a capacitive sensor, in accordance with embodiments of the disclosure.
Figure 7:
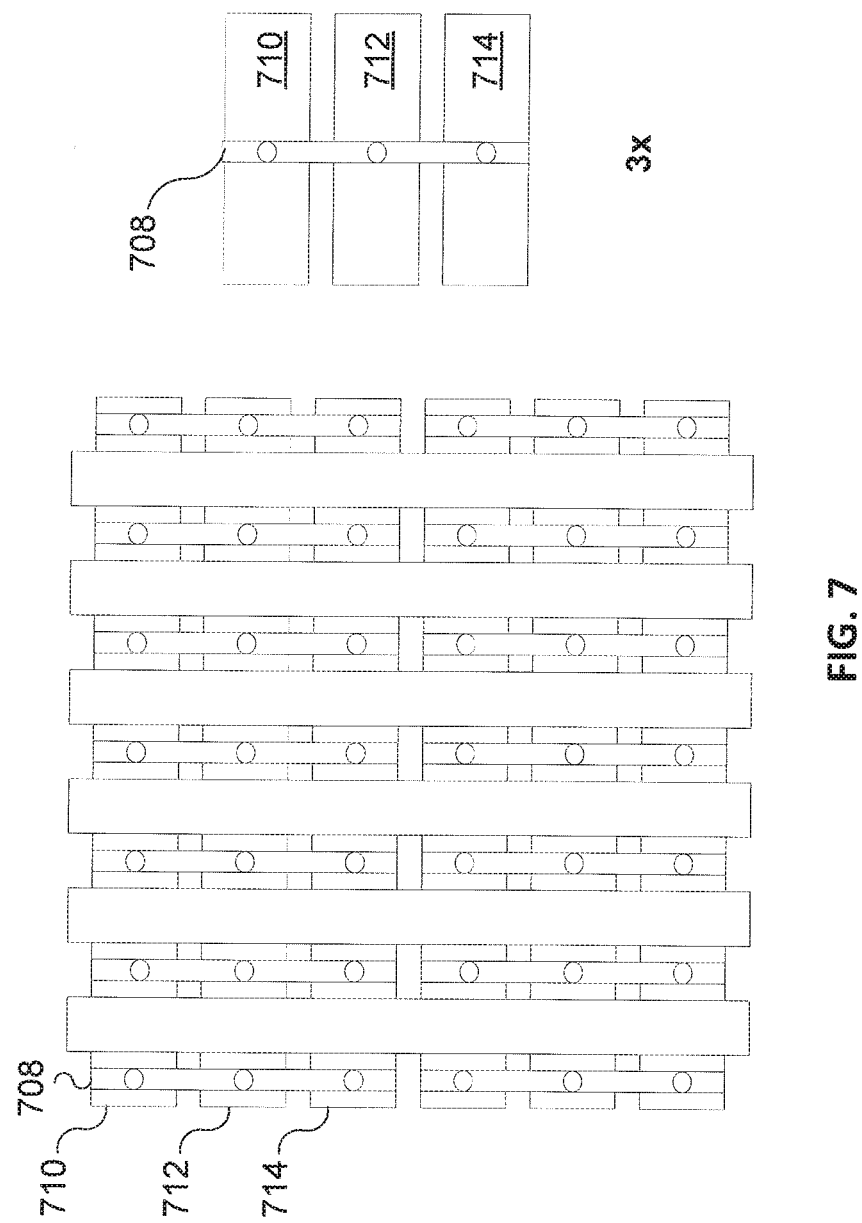

FIGS. 6-7 depict various alternative implementations of a capacitive sensor, in accordance with embodiments of the disclosure. In the embodiments depicted in FIGS. 6-7, various transmitter electrodes from a second metal layer are connected using plates on the first receiver electrode layer and corresponding vias. In the embodiments shown in FIGS. 6-7, the plates comprise metal traces that electrically connect vias that are connected to different electrodes. In the example shown in FIG. 6, two electrodes 602, 604 are connected by way of metal trace 606. In the example shown in FIG. 7, three electrodes 710, 712, 714 are connected by way of metal trace 708.

Figure 8:
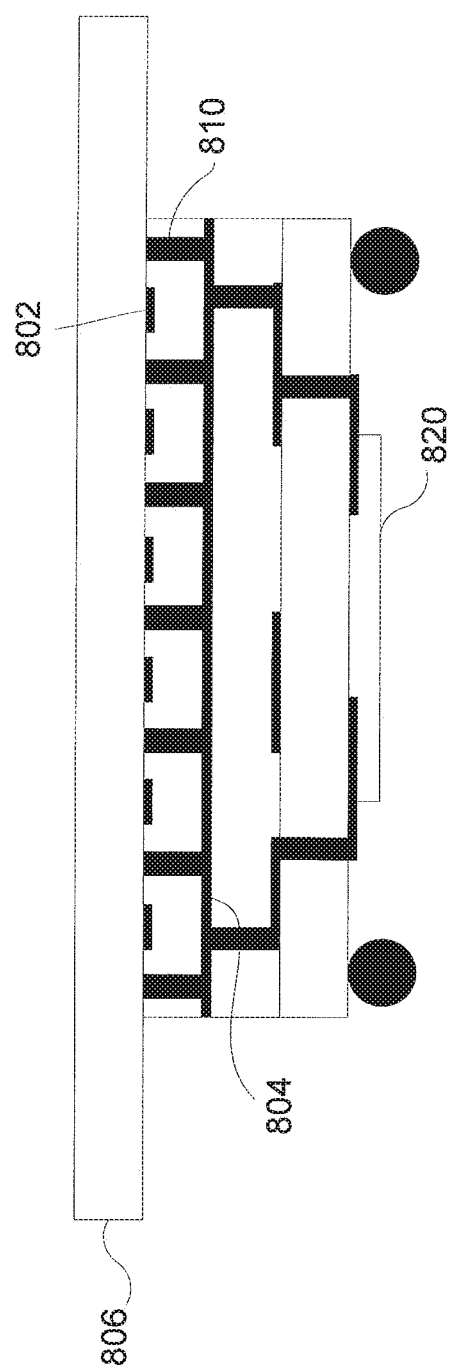
FIG. 8 depicts another alternative implementation of a capacitive sensor, in accordance with an embodiment the disclosure.

FIG. 8 depicts another alternative implementation of a capacitive sensor, in accordance with an embodiment the disclosure. In the embodiment of FIG. 8, a fingerprint package is depicted that includes a fingerprint controller 820, and a multilayer substrate that includes a plurality of conductive layers and conductive routing (shown in black). In this example, the first metal layer includes columns of receiver electrodes (Rx) 802, and the second metal layer includes rows of transmitter electrodes (Tx) 804. The first layer also includes vias 810 connecting the first metal layer to the second metal layer to bring the transmitter electrodes 804 level with the receiver electrode plane. There are also one or more additional metal layers for routing, shielding, or other connections to the controller 820. In one embodiment, the fingerprint controller 820 includes an integrated circuit (IC) formed in a semiconductor die. A variety of different substrate types and materials may be used. In one embodiment, the substrate is a multi-layer printed circuit board (PCB). In one embodiment, a cover layer 806 includes a cover lens or cover glass of a display. The vias 810 and additional metal layers for routing can be formed in the sensor substrate to improve the signal, without requiring the vias 810 and additional metal layers to be formed in or through the cover layer 806 and thus affect the structural integrity of glass.

FIGS. 9A-9B depict a capacitive sensor with a conductive structure 910 including a via 911 and a plate 912, in accordance with an embodiment the disclosure. As shown, transmitter electrodes 904 are formed in a layer on top of dielectric layer 900, which can be one of multiple intervening layers in a substrate (see, e.g., FIG. 8). A dielectric layer 908 is then formed on top of the layer of transmitter electrodes 904. Vias 911 are formed within the dielectric layer 908. Receiver electrodes 902 are then formed in a layer on top of the dielectric layer 908. Additionally, plates 912 are formed in the same layer as the receiver electrodes 902, where the plates 912 are electrically connected to the vias 911 to form the conductive structures 910. In the embodiment shown in FIGS. 9A-9B, the plates 912 comprise metal pads. As such, the transmitter electrodes 904 are brought up to the same plane as the receiver electrodes 902 by way of the electric connection between the transmitter electrodes 904, the vias 911, and the plates 912. A cover layer 906 may then be formed over the receiver electrodes 902 and the plates 912.

FIG. 9C depicts a capacitive sensor with a conductive structure 910 including a via 911, in accordance with an embodiment the disclosure. As shown, transmitter electrodes 904 are formed in a layer on top of dielectric layer 900, which can be one of multiple intervening layers in a substrate (see, e.g., FIG. 8). A dielectric layer 908 is then formed on top of the layer of transmitter electrodes 904. Vias 911 are formed within the dielectric layer 908. Receiver electrodes 902 are then formed in a layer on top of the dielectric layer 908. However, in contrast to the embodiment shown in FIG. 9A, the conductive structures 910 in FIG. 9C include the vias 911, but no plates are formed in the same layer as the receiver electrodes 902.

Figure 10:
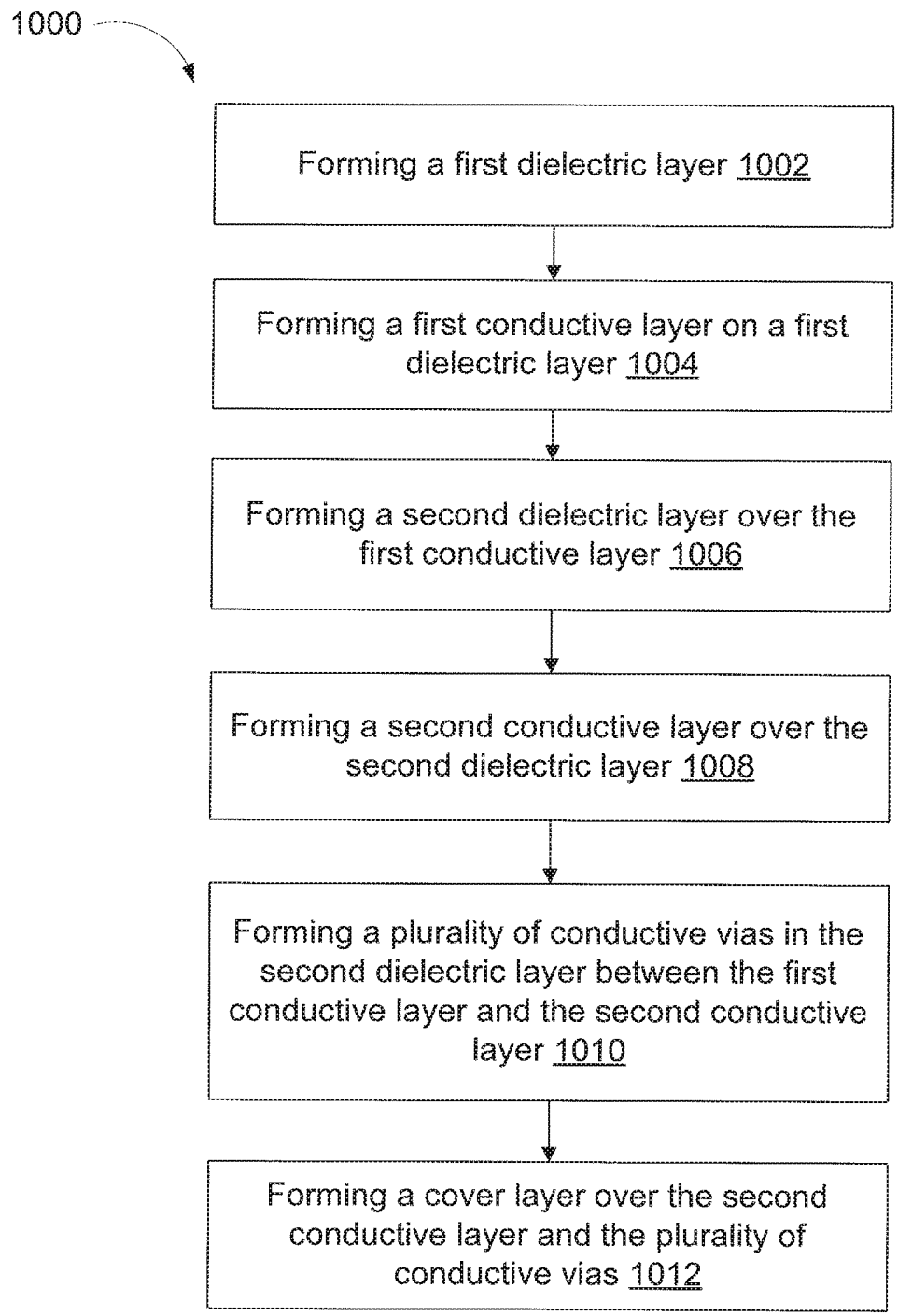
FIG. 10 is a flow diagram of method steps for method 1000 of making a capacitive sensor, in accordance with embodiments of the disclosure.

FIG. 10 is a flow diagram of method steps for method 1000 of making a capacitive sensor, in accordance with embodiments of the disclosure. As step 1002, a first dielectric layer is formed. At step 1004, a first conductive layer is formed on a first dielectric layer. The first conductive layer may include a plurality of rows of sensor electrodes.

At step 1006, a second dielectric layer over the first conductive layer is formed. At step 1008, a second conductive layer is formed over the second dielectric layer. The second conductive layer may include a plurality of columns of sensor electrodes, and the plurality of columns of sensor electrodes are arranged orthogonally to the plurality of rows of sensor electrodes to form a two-dimensional sensing array.

At step 1010, a plurality of conductive vias is formed in the second dielectric layer between the first conductive layer and the second conductive layer. For each conductive via of the plurality of conductive vias, a first end of the conductive via is electrically connected to a sensor electrode in the plurality of rows of sensor electrodes and a second end of the conductive via is capacitively coupled to a sensor electrode in the plurality of columns of sensor electrodes to form a trans-capacitive sensing pixel of the two-dimensional sensing array.

In one embodiment, forming the plurality of conductive vias comprises drilling a through hole to a sensor electrode in the first conductive layer at each trans-capacitive sensing pixel in the two-dimensional array and plating the through hole at each trans-capacitive sensing pixel in the two-dimensional array. In another embodiment, forming the plurality of conductive vias comprises building up a via from a sensor electrode in the first conductive layer at each trans-capacitive sensing pixel in the two-dimensional array, and wherein forming the second dielectric layer comprises filling dielectric between the conductive vias at each trans-capacitive sensing pixel in the two-dimensional array.

In some embodiments, the second conductive layer further includes a plurality of plates, wherein each of the plates is electrically connected to a conductive via and capacitively coupled to a sensor electrode in the plurality of columns of sensor electrodes.

At step 1012, a cover layer is formed over the second conductive layer and the plurality of conductive vias. An input object, such as a finger, that is placed on or near the cover layer alters an electric field near the plurality of columns of sensor electrodes.

While embodiments described above depict pillars connected to the transmitter electrodes to bring them level or closer to the receiver electrodes, this can be inverted in other embodiments and the pillars can be connected to receiver electrodes to bring them closer to the transmitter electrodes. Similarly, while embodiments described above depict receiver electrodes disposed above the transmitter electrodes (i.e., receiver electrodes are closer to the sensing region above the cover layer), this can be reversed and the transmitter electrodes can be disposed above the receiver electrodes. Similarly, the process steps depicted in FIG. 10 can also be inverted.

The embodiments and examples set forth herein were presented in order to best explain the present disclosure and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A capacitive sensor, comprising:
a plurality of rows of sensor electrodes included in a first layer;
a plurality of columns of sensor electrodes included in a second layer, wherein the plurality of columns of sensor electrodes are arranged orthogonally to the plurality of rows of sensor electrodes to form a two-dimensional sensing array; and
a plurality of conductive elements included in a third layer disposed between the first layer and the second layer, wherein, for each conductive element of the plurality of conductive elements, a first end of the conductive element is electrically connected to a sensor electrode in the plurality of rows of sensor electrodes and a second end of the conductive element is capacitively coupled to a sensor electrode in the plurality of columns of sensor electrodes to form a trans-capacitive sensing pixel of the two-dimensional sensing array.

2. The capacitive sensor of claim 1, further comprising a cover layer, wherein the second layer is closer to the cover layer than the first layer.

3. The capacitive sensor of claim 1, wherein the plurality of rows of sensor electrodes comprises receiver electrodes and the plurality of columns of sensor electrodes comprises transmitter electrodes.

4. The capacitive sensor of claim 1, wherein the plurality of columns of sensor electrodes comprises receiver electrodes and the plurality of rows of sensor electrodes comprises transmitter electrodes.

5. The capacitive sensor of claim 1, wherein each conductive element in the plurality of conductive element comprises a via that extends through a thickness of the third layer.

6. The capacitive sensor of claim 1, further comprising:
a plurality of plates included in the second layer, wherein each of the plates is electrically connected to a conductive element in the plurality of conductive elements and capacitively coupled to a sensor electrode in the plurality of columns of sensor electrodes.

7. The capacitive sensor of claim 6, wherein:
each of the plates comprises a metal pad electrically connected to a single conductive element in the plurality of conductive elements; or
each of the plates comprises a metal trace electrically connected to multiple conductive elements in the plurality of conductive elements.

8. The capacitive sensor of claim 1, wherein the two-dimensional sensing array has a resolution configured to capture features of a fingerprint.

9. A method of making a capacitive sensor, the method comprising:
forming a first conductive layer on a first dielectric layer, wherein the first conductive layer includes a plurality of rows of sensor electrodes;
forming a second dielectric layer over the first conductive layer;
forming a second conductive layer over the second dielectric layer, wherein the second conductive layer includes a plurality of columns of sensor electrodes, and the plurality of columns of sensor electrodes are arranged orthogonally to the plurality of rows of sensor electrodes to form a two-dimensional sensing array; and
forming a plurality of conductive vias in the second dielectric layer between the first conductive layer and the second conductive layer, wherein, for each conductive via of the plurality of conductive vias, a first end of the conductive via is electrically connected to a sensor electrode in the plurality of rows of sensor electrodes and a second end of the conductive via is capacitively coupled to a sensor electrode in the plurality of columns of sensor electrodes to form a trans-capacitive sensing pixel of the two-dimensional sensing array.

10. The method of claim 9, wherein forming the plurality of conductive vias comprises drilling a through hole to a sensor electrode in the first conductive layer at each trans-capacitive sensing pixel in the two-dimensional array and plating the through hole at each trans-capacitive sensing pixel in the two-dimensional array.

11. The method of claim 9, wherein forming the plurality of conductive vias comprises building up a via from a sensor electrode in the first conductive layer at each trans-capacitive sensing pixel in the two-dimensional array, and wherein forming the second dielectric layer comprises filling dielectric between the conductive vias at each trans-capacitive sensing pixel in the two-dimensional array.

12. The method of claim 9, wherein the second conductive layer further includes a plurality of plates, wherein each of the plates is electrically connected to a conductive via and capacitively coupled to a sensor electrode in the plurality of columns of sensor electrodes.

13. The method of claim 9, further comprising:
forming a cover layer over the second conductive layer and the plurality of conductive vias, wherein an input object placed on or near the cover layer alters an electric field near the plurality of columns of sensor electrodes.

14. The method of claim 9, wherein the plurality of rows of sensor electrodes comprises receiver electrodes and the plurality of columns of sensor electrodes comprises transmitter electrodes.

15. The method of claim 9, wherein the plurality of columns of sensor electrodes comprises receiver electrodes and the plurality of rows of sensor electrodes comprises transmitter electrodes.

16. A capacitive sensor, comprising:
a first layer comprising a plurality of rows of transmitter electrodes;
a second layer disposed above the first layer comprising a plurality of columns of receiver electrodes, wherein the plurality of columns of transmitter electrodes overlap the plurality of rows of receiver electrodes to form a two-dimensional sensing array having a resolution configured to capture features of an input;
a plurality of conductive vias between the first layer to the second layer, the plurality of conductive vias comprising a conductive via disposed at a sensing pixel of the two-dimensional sensing array, wherein the conductive via has a first end capacitively coupled to a receiver electrode in the plurality of columns of receiver electrodes and a second end electrically connecting a transmitter electrode of the plurality of rows of transmitter electrodes;
a cover layer disposed above the second layer, wherein the cover layer comprises a top surface that forms an input surface for the input and a dielectric separating the top surface from the conductive vias and the second layer;
driver circuitry connected to the transmitter electrodes, wherein the driver circuitry is configured to drive a transmitter signal onto the transmitter electrodes; and
receiver circuitry connected to the receiver electrodes, wherein the receiver circuitry is configured to process resulting signals corresponding to the transmitter signals, wherein the resulting signals vary based on presence of the input at the top surface of the cover layer.

17. The capacitive sensor of claim 16, wherein the plurality of conductive vias are formed by drilling a through hole to a transmitter electrode in the plurality of rows of transmitter electrodes at each sensing pixel in the two-dimensional array and plating the through hole at each sensing pixel in the two-dimensional array.

18. The capacitive sensor of claim 16, wherein the second layer further includes a plurality of plates, wherein each of the plates is electrically connected to a conductive via and capacitively coupled to a receiver electrode in the plurality of columns of receiver electrodes.

19. The capacitive sensor of claim 16, wherein the capacitive sensor comprises a fingerprint sensor and the input comprises a finger.

20. The capacitive sensor of claim 19, wherein the resulting signals vary based on presence of fingerprint ridges or fingerprint valleys of the finger at the top surface of the cover layer.

* * * * *